(12) United States Patent
Nicholas et al.

(10) Patent No.: US 9,375,893 B2
(45) Date of Patent: Jun. 28, 2016

(54) AUTOMOTIVE PANELS

(71) Applicant: BASF SE, Ludwigshafen (DE)

(72) Inventors: Karl Richard Nicholas, Aurora, IL (US); Garry Balthes, Elkhart, IN (US); Brad Joseph Martin, Dearborn, MI (US)

(73) Assignee: BASF SE, Ludwigshafen (DE)

( * ) Notice: Subject to any disclaimer, the term of this patent is extended or adjusted under 35 U.S.C. 154(b) by 60 days.

(21) Appl. No.: 14/212,640

(22) Filed: Mar. 14, 2014

(65) Prior Publication Data
US 2014/0272400 A1 Sep. 18, 2014

Related U.S. Application Data

(60) Provisional application No. 61/783,066, filed on Mar. 14, 2013, provisional application No. 61/787,108, filed on Mar. 15, 2013.

(51) Int. Cl.
| | |
|---|---|
| *B32B 5/08* | (2006.01) |
| *B32B 5/02* | (2006.01) |
| *B32B 5/06* | (2006.01) |
| *B32B 5/10* | (2006.01) |
| *B32B 5/24* | (2006.01) |
| *B32B 7/02* | (2006.01) |
| *B32B 7/04* | (2006.01) |
| *B32B 7/08* | (2006.01) |
| *B32B 19/02* | (2006.01) |
| *B32B 19/04* | (2006.01) |
| *B32B 23/02* | (2006.01) |
| *B32B 23/04* | (2006.01) |
| *B32B 23/08* | (2006.01) |
| *B32B 27/06* | (2006.01) |
| *B32B 27/12* | (2006.01) |
| *B32B 27/20* | (2006.01) |
| *B32B 27/28* | (2006.01) |
| *B32B 27/30* | (2006.01) |
| *B32B 27/32* | (2006.01) |
| *B32B 27/36* | (2006.01) |
| *B32B 27/40* | (2006.01) |

(52) U.S. Cl.
CPC . *B32B 5/08* (2013.01); *B32B 5/022* (2013.01); *B32B 5/06* (2013.01); *B32B 5/10* (2013.01); *B32B 5/24* (2013.01); *B32B 7/02* (2013.01); *B32B 7/04* (2013.01); *B32B 7/045* (2013.01); *B32B 7/08* (2013.01); *B32B 19/02* (2013.01); *B32B 19/04* (2013.01); *B32B 19/045* (2013.01); *B32B 23/02* (2013.01); *B32B 23/04* (2013.01); *B32B 23/08* (2013.01); *B32B 27/06* (2013.01); *B32B 27/12* (2013.01); *B32B 27/20* (2013.01); *B32B 27/285* (2013.01); *B32B 27/288* (2013.01); *B32B 27/304* (2013.01); *B32B 27/308* (2013.01); *B32B 27/32* (2013.01); *B32B 27/36* (2013.01); *B32B 27/40* (2013.01); *B32B 2307/3065* (2013.01); *B32B 2605/00* (2013.01); *Y10T 428/266* (2015.01); *Y10T 428/269* (2015.01); *Y10T 428/31565* (2015.04)

(58) Field of Classification Search
CPC ............ B32B 5/022; B32B 5/06; B32B 5/08; B32B 5/10; B32B 5/24; B32B 7/02; B32B 7/04; B32B 7/08; B32B 19/02; B32B 19/04; B32B 19/08; B32B 27/06; B32B 27/12; B32B 27/20; B32B 27/285; B32B 27/288; B32B 27/304; B32B 27/308; B32B 27/32; B32B 27/36; B32B 27/40; B32B 2307/3065; B32B 2605/00
USPC ............................ 428/361, 375, 423.7, 424.2
See application file for complete search history.

(56) References Cited

U.S. PATENT DOCUMENTS

| | | |
|---|---|---|
| 5,573,092 A | 11/1996 | Gabilondo |
| 5,891,563 A | 4/1999 | Letts |
| 6,044,604 A | 4/2000 | Clayton et al. |
| 6,117,375 A | 9/2000 | Garrett et al. |
| 6,205,728 B1 | 3/2001 | Sutelan |
| 6,767,623 B1 | 7/2004 | Moeck et al. |
| 7,387,753 B2 | 6/2008 | Tackett et al. |
| 7,612,120 B2 | 11/2009 | Letts |
| 7,749,598 B2 | 7/2010 | Agrawal |

(Continued)

FOREIGN PATENT DOCUMENTS

| | | |
|---|---|---|
| CN | 201291619 Y | 8/2009 |
| DE | 29607085 U1 | 6/1996 |

(Continued)

OTHER PUBLICATIONS

International Search Report and Written Opinion issued in International Application No. PCT/US2014/028854, dated Jul. 2, 2014.
International Search Report issued in International Application No. PCT/IB2014/001574 on Oct. 28, 2014.

*Primary Examiner* — Thao T Tran
(74) *Attorney, Agent, or Firm* — Meunier Carlin & Curfman LLC

(57) ABSTRACT

A panel construction suitable for automotive parts comprises (a) a first composite fiber mat layer (b) adjacent to and covering a face of the fiber mat, a thermoplastic polymer film and optionally (c) adjacent to and covering the thermoplastic film, a second composite fiber mat layer, where the fiber mats comprise non-woven fibers or fabrics and a cured acrylic resin binder. The thermoplastic film is preferably a thermoplastic polyurethane film. The construction preferably contains no adhesive layer between components (a), (b) and (c).

14 Claims, No Drawings

(56) References Cited

U.S. PATENT DOCUMENTS

| | | |
|---|---|---|
| 7,763,134 B1 | 7/2010 | Kumar |
| 7,838,568 B2 | 11/2010 | Letts et al. |
| 7,989,370 B2 | 8/2011 | Currier et al. |
| 2003/0032351 A1 | 2/2003 | Horner, Jr. et al. |
| 2003/0082365 A1 | 5/2003 | Geary et al. |
| 2003/0153656 A1 | 8/2003 | Sjerps |
| 2004/0109983 A1 | 6/2004 | Rotter et al. |
| 2005/0095415 A1* | 5/2005 | Raghavendran ........... 428/292.1 |
| 2008/0174147 A1 | 7/2008 | Skaradzinski |
| 2008/0233342 A1 | 9/2008 | Birrell |
| 2010/0256372 A1 | 10/2010 | Tyagi et al. |
| 2011/0135870 A1* | 6/2011 | Gleich et al. .................... 428/95 |
| 2011/0281076 A1* | 11/2011 | Anderson et al. ............. 428/165 |
| 2011/0308181 A1 | 12/2011 | Freeman |
| 2012/0167510 A1 | 7/2012 | Brandt et al. |

FOREIGN PATENT DOCUMENTS

| | | |
|---|---|---|
| DE | 10250023 A1 | 5/2004 |
| EP | 0184768 A2 | 6/1986 |
| GB | 2408012 A | 5/2005 |

\* cited by examiner

AUTOMOTIVE PANELS

CROSS-REFERENCE TO RELATED APPLICATIONS

This application claims the benefit of priority to U.S. Provisional Patent Application No. 61/783,066 filed Mar. 14, 2013, and also claims the benefit of priority to U.S. Provisional Patent Application No. 61/787,108 filed Mar. 15, 2013, both of which are incorporated by reference herein in their entirety.

FIELD

The present disclosure is aimed at lightweight, strong, and durable automotive panels, in particular underbody shields.

BACKGROUND

Automobile makers are currently looking for strong, lightweight materials for automotive parts. Replacing existing metal parts with more lightweight parts will reduce fuel consumption.

SUMMARY

Accordingly, disclosed is a panel construction suitable as an automobile part, which comprises:
(a) a first composite fiber mat layer and
(b) adjacent to and covering a face of the fiber mat, a thermoplastic polymer film and optionally
(c) adjacent to and covering the thermoplastic film, a second composite fiber mat layer,
where the composite fiber mats comprise fibers or fabrics and a cured acrylic resin binder.

DETAILED DESCRIPTION

Disclosed is a panel construction suitable as an automobile part, which comprises:
(a) a first composite fiber mat layer and
(b) adjacent to and covering a face of the fiber mat, a thermoplastic polymer film and optionally
(c) adjacent to and covering the thermoplastic film, a second composite fiber mat layer,
where the composite fiber mats comprise fibers or fabrics and a cured acrylic resin binder.

The panel construction comprises a 2 layer system of fiber mat and thermoplastic polymer film or a 3 layer system. The 3 layer system contains a thermoplastic polymer film in between two fiber mat layers.

The fiber mats comprise non-woven fibers or fabric, woven fabrics or non-crimp fabrics and a cured thermoset acrylic binder. Preferably, the fiber mats comprise non-woven fibers.

The fibers are natural, synthetic or glass fibers. Synthetic fibers are for instance carbon fibers or polyester fibers. Natural fibers are for instance cellulosic bast fibers. The non-woven fibers may contain a small amount synthetic thermoplastic fiber, for instance polyethylene terephthalate fibers (PET). The fibers may be synthetic polyester fibers or other fibers of similar characteristics. The fibers are chosen to sustain all environmental conditions.

The acrylic binder is a cured aqueous based acrylic resin. The binder cures for instance through the carboxylic groups and a multi-functional alcohol.

Acrylic binders are polymers or copolymers containing units of acrylic acid, methacrylic acid, their esters or related derivatives.

The acrylic binders are for instance formed by aqueous emulsion polymerization employing (meth)acrylic acid (where the convention (meth)acrylic is intended to embrace both acrylic and methacrylic), 2-hydroxyethyl(meth)acrylate, 2-hydroxypropyl(meth)acrylate, 2-hydroxybutyl(meth)acrylate, methyl(meth)acrylate, ethyl(meth)acrylate, propyl (meth)acrylate, isopropyl(meth)acrylate, butyl(meth)acrylate, amyl(meth)acrylate, isobutyl(meth)acrylate, t-butyl (meth)acrylate, pentyl(meth)acrylate, isoamyl(meth)acrylate, hexyl(meth)acrylate, heptyl(meth)acrylate, octyl (meth)acrylate, isooctyl(meth)acrylate, 2-ethylhexyl(meth)acrylate, nonyl(meth)acrylate, decyl(meth)acrylate, isodecyl (meth)acrylate, undecyl(meth)acrylate, dodecyl(meth)acrylate, lauryl(meth)acrylate, octadecyl(meth)acrylate, stearyl(meth)acrylate, tetrahydrofurfuryl(meth)acrylate, butoxyethyl(meth)acrylate, ethoxydiethylene glycol (meth)acrylate, benzyl(meth)acrylate, cyclohexyl(meth)acrylate, phenoxyethyl(meth)acrylate, polyethylene glycol mono (meth)acrylate, polypropylene glycol mono(meth)acrylate, methoxyethylene glycol (meth)acrylate, ethoxyethoxyethyl (meth)acrylate, methoxypolyethylene glycol (meth)acrylate, methoxypolypropylene glycol (meth)acrylate, dicyclopentadiene(meth)acrylate, dicyclopentanyl(meth)acrylate, tricyclodecanyl(meth)acrylate, isobornyl(meth)acrylate, bornyl (meth)acrylate or mixtures thereof.

Other monomers which can be co-polymerized with the (meth)acrylic monomers, generally in a minor amount, include styrene, diacetone(meth)acrylamide, isobutoxymethyl(meth)acrylamide, N-vinylpyrrolidone, N-vinylcaprolactam, N,N-dimethyl(meth)acrylamide, t-octyl(meth)acrylamide, N,N-diethyl(meth)acrylamide, N,N'-dimethylaminopropyl(meth)acrylamide, (meth)acryloylmorphorine; vinyl ethers such as hydroxybutyl vinyl ether, lauryl vinyl ether, cetyl vinyl ether, and 2-ethylhexyl vinyl ether; maleic acid esters; fumaric acid esters and similar compounds.

Multi-functional alcohols are for instance hydroquinone, 4,4'-dihydroxydiphenyl, 2,2-bis(4-hydroxyphenyl)propane, cresols or alkylene polyols containing 2 to 12 carbon atoms, including ethylene glycol, 1,2- or 1,3-propanediol, 1,2-, 1,3- or 1,4-butanediol, pentanediol, hexanediol, octanediol, dodecanediol, diethylene glycol, triethylene glycol, 1,3-cyclopentanediol, 1,2-, 1,3- or 1,4-cyclohexanediol, 1,4-dihydroxymethylcyclohexane, glycerol, tris($\beta$-hydroxyethyl)amine, trimethylolethane, trimethylolpropane, pentaerythritol, dipentaerythritol, tripentaerythritol and sorbitol.

The aqueous based acrylic binders are commercially available under the ACRODUR name from BASF.

The aqueous based acrylic resin is infused in the fiber mat. That is to say, the fiber mat is impregnated with the acrylic resin. The fiber mats are compressed and cured with heat and pressure. Pressure is not required for curing, but for setting a desired thickness or density or shape.

Forming takes place for instance in a heated, shaped tool to a desired shape.

The aqueous based acrylic binder may be applied to the non-woven fibers or fabrics either through a dip-and-squeeze method, a curtain coater or a foam injection method. The mixture is dried to a low moisture content (about 4% to 7% by weight) prior to thermal curing. This is the fiber mat prepreg.

During initial heating and compression, compression release allows moisture to vent. The number of releases depends on the amount of moisture contained in the un-cured mat. The cured fiber mat does not contain significant amounts of water, for instance from 0% to about 3% or from about 0.1 percent to about 2% by weight, based on the dry weight.

Once cured, the fiber mat does not significantly swell.

A typical mat basis weight is from about 100 grams/square meter (gsm) to about 1400 grams/square meter. The acrylic resin loading is from about 15% to about 50%, preferably from about 20% to about 40% by weight, of dried resin based on the finished mat weight.

A typical fiber mat is generally about 1 cm thick prior to curing. Once pressed and cured, the fiber mat is generally from about 1.5 to about 2 mm thick.

In the 3 layer system, the two fiber mats may be identical or different. They may be of the same basis weight or thickness or be of different basis weight or thickness. The fibers employed in the two fiber mats of the 3 layer system may be the same or different.

The term "panel constructions" means shaped parts. Fastening features may be designed within the structures to improve the process of assembly and reduce air and water ingress.

The thermoplastic film may comprise any suitable plastic, for instance the thermoplastic film is a polyvinylchloride (PVC), polyethylene, polyester, polyetheretherketone (PEEK) or a polyurethane film. The thermoplastic polymer film is preferably a thermoplastic polyurethane (TPU) film.

Thermoplastic polyurethane resin is well known and is commercially available for instance under the trade names ELASTOLLAN (BASF) and DESMOPAN (Bayer).

Commercially available TPU resin is generally based on either polyester or polyether polyol and either aromatic or aliphatic isocyanate. Preferably, the present TPU is aliphatic-based, that is, based on aliphatic isocyanate compounds, which provides for superior weather resistance.

The present thermoplastic film is applied to the outside face of the fiber mat for instance in a molten form. The film may penetrate the pores of the fiber mat and mechanically bond thereto. The remaining portion of the film creates a durable surface. Alternatively, the thermoplastic film may reside up to 80%, 90% or substantially completely within the surface of the fiber mat.

Conveniently, the thermoplastic film resin may be mixed with plastics additives such as pigments, dyes, flame retardants, hindered amine light stabilizers, ultraviolet light (UV) absorbers, anti-static agents and the like. Pigments are advantageously added to the thermoplastic resin to provide the film with a desired color. The pigments may be conventional pigments or effect pigments. Flame retardants and hindered amine light stabilizers are also advantageously added to the thermoplastic resin. Suitable ultraviolet light stabilizers are for instance selected from hydroxyphenylbenzotriazoles and hydroxyphenyl-s-triazines. The ultraviolet light absorbers (UVAs) and hindered amine light stabilizers (HALS) are well known commercial products available under the TINUVIN trade name (BASF).

The thermoplastic film resin is generally melt blended with the desired additives and then formed into pellets. Masterbatches of resin and additives may be employed.

The thermoplastic film in total is from about 1 mil to about 12 mils thick.

In the 2 layer system the side with the thermoplastic film is intended to face the exterior and be exposed to weather, gravel, etc.

In the 2 layer system, the thermoplastic film is preferably aliphatic TPU. In the 3 layer system, the thermoplastic film is preferably aromatic TPU, based on aromatic isocyanate compounds.

It is mentioned above that the thermoplastic film may also be formulated with flame retardants, light stabilizers, etc. The fiber mats may also be formulated with these additives.

The present panel constructions may advantageously employ no adhesive layers between components (a), (b) and (c).

As mentioned, forming of the fiber mat takes place for instance in a heated, shaped tool to a desired shape, for instance a compression tool. A fiber mat prepreg is placed in a hot molding tool. The molten thermoplastic resin is then applied to the prepreg for instance via injection molding. The tool may then be closed by hydraulic press to compress the 2 layers into a sturdy composite. A scrim may be used between the thermoplastic film and tool surface as required.

Alternatively, a thermoplastic resin may be coextruded with a release liner to form a film. The thermoplastic film is applied to a surface of a fiber mat with heat and pressure. The thermoplastic film is from about 1 mil to about 12 mils thick while the release liner is about 1 mil thick. This construction may be formed in a heated, shaped tool. The release liner will have poor adhesion to the thermoplastic film and after thermoforming the release liner can be separated from the tool and the thermoplastic film. The release liner may be for instance a polyolefin while the thermoplastic film is for instance TPU.

In the 3 layer system, a second fiber mat is applied on the thermoplastic film layer. The hot tool is closed by hydraulic press to compress the 3 layers into a sturdy composite. In the 3-layer system, the thermoplastic film may reside essentially completely within the adjacent surfaces of the fiber mats or up to about 40% of the thermoplastic film may reside between the fiber mats as a discrete layer.

Other advantages of the present constructions are that they are mechanically stable, are seamless panels, may employ a variety of colors via incorporation of pigments, are field repairable with auto body techniques, have good thermal shock resistance, have high strength/low weight, have easy handling and mobility, reduce production steps, have high sound damping, are weather and moisture resistant and are non-permeable.

The panel constructions are suitable for a lower sound shield, acoustical belly pan, aero shield, splash shield, underbody panel, chassis shield, wheel well liners and the like. The present panels reduce wind drag, improve mileage performance, reduce engine noise and prevent excessive water or snow intrusion into the engine compartment.

Additional layers, such as a foam layer, may also be part of the panel constructions. In the 3 layer system, the foam layer would be attached and cover one or both faces of the fiber mats. In the 2 layer system, the foam layer would be attached and cover the face of the fiber mat while the thermoplastic film covers the other face of the fiber mat. The foam layer may comprise those known such as polyurethane, polyisocyanate or a mixture thereof. The foam layer may be applied to the fiber mat with an adhesive layer.

Specifically, the following embodiments are disclosed.

Embodiment 1

A panel construction suitable as an automobile part, comprising
(a) a first composite fiber mat layer and
(b) adjacent to and covering a face of the fiber mat, a thermoplastic polymer film, and optionally
(c) adjacent to and covering the thermoplastic film, a second composite fiber mat layer, where the composite fiber mat comprises fibers or fabrics and a cured acrylic resin binder.

Embodiment 2

A panel construction according to embodiment 1, where the thermoplastic film is a polyvinylchloride, polyethylene, polyester, polyetheretherketone, or a polyurethane film.

Embodiment 3

A panel construction according to embodiment 1, where the thermoplastic film is a thermoplastic polyurethane film.

Embodiment 4

A panel construction according to embodiments 1, 2 or 3, where the fiber mat a) comprises non-woven cellulosic bast fibers, non-woven polyester fibers or glass fibers and the acrylic resin is from about 15% to about 50% by weight dry resin, based on the weight of the fiber mat.

Embodiment 5

A panel construction according to any of the preceding embodiments, where the thermoplastic polymer film comprises one or more additives selected from the group consisting of pigments, dyes, flame retardants, hindered amine light stabilizers, ultraviolet light absorbers and anti-static agents.

Embodiment 6

A panel construction according to any of the preceding embodiments, which construction contains no adhesive layers between components (a), (b) and (c).

Embodiment 7

A panel construction according to any of the preceding embodiments, where the fiber mats are from about 1.5 to about 2 mm thick.

Embodiment 8

A panel construction according to any of the preceding embodiments, where the thermoplastic film in total is from about 1 mil to about 12 mils thick.

Embodiment 9

A panel construction according to any of the preceding embodiments, which is a 3 layer system comprising components (a), (b) and (c).

Embodiment 10

A panel construction according to embodiment 9, where the two fiber mats are identical.

Embodiment 11

A panel construction according to embodiment 9, where the two fiber mats are not identical.

Embodiment 12

A panel construction according to any of embodiments 1 to 8, where a portion of the thermoplastic polymer film resides beneath the surface of the first fiber mat.

Embodiment 13

An automotive part comprising the panel construction according to any of the preceding embodiments.

Embodiment 14

The automotive part according to embodiment 13, wherein the automotive part is a lower sound shield, acoustical belly pan, aero shield, splash shield, underbody panel, chassis shield or a wheel well liner.

Example

Wheel or Underbody Shield Liners

A mixture of an aqueous based acrylic binder, ACRODUR, is applied to a non-woven glass/PET fiber matrix. The acrylic resin content is 30% by weight, dry weight of resin based on the total weight of the mat. This is a fiber mat prepreg.

The first fiber mat prepreg layer of a wheel liner with a dry weight of 1200 grams/m$^2$ is placed on a hot molding tool. A molten thermoplastic polyurethane resin, ELASTOLLAN 1160D10, is then applied to the shaped fiber mat to form a film. A second fiber mat prepreg with a dry basis weight of 500 grams/m$^2$ is then laid on the thermoplastic film layer. The hot tool is closed by hydraulic press compressing the 3 layers into a sturdy composite structure formed to the shape of the molding tool, in this case a wheel liner. About 40% of the thermoplastic film resides beneath the surface of the first fiber mat and about 30% of the thermoplastic film resides beneath the surface of the second fiber mat. The remaining 30% of the thermoplastic film is a discrete thermoplastic layer between the fiber mats.

What is claimed is:

1. A panel construction suitable as an automobile part, comprising:
    (a) a first composite fiber mat layer and
    (b) adjacent to and covering a face of the first composite fiber mat layer, a thermoplastic polymer film,
    wherein the first composite fiber mat layer comprises fibers or fabrics and a cured acrylic resin binder,
    wherein the thermoplastic polymer film penetrates the first composite fiber mat layer, and
    wherein the thermoplastic polymer film is substantially completely within the surface of the first fiber mat, and the acrylic resin is from about 20% to about 40% by weight of dried resin, based on the finished weight of the first composite fiber mat layer.

2. The panel construction according to claim 1, wherein the thermoplastic polymer film is a polyvinylchloride, polyethylene, polyester, polyetheretherketone, or a polyurethane film.

3. The panel construction according to claim 1, wherein the thermoplastic polymer film is a thermoplastic polyurethane film.

4. The panel construction according to claim 1, wherein the first composite fiber mat layer comprises non-woven cellulosic bast fibers, non-woven polyester fibers or glass fibers.

5. The panel construction according to claim 1, wherein the thermoplastic polymer film comprises one or more additives selected from the group consisting of pigments, dyes, flame retardants, hindered amine light stabilizers, ultraviolet light absorbers, and anti-static agents.

6. The panel construction according to claim 1, wherein the thermoplastic polymer film in total is from about 1 mil to about 12 mils thick.

7. The panel construction according to claim 1, further comprising a second composite fiber mat adjacent to and covering the thermoplastic film.

8. The panel construction according to claim 7, which is a three-layer system comprising components (a), (b), and (c).

9. The panel construction according to claim 7, wherein the first and second composite fiber mat layers are from about 1.5 to about 2 mm thick.

10. The panel construction according to claim 8, which construction contains no adhesive layers between components (a), (b) and (c).

11. The panel construction according to claim 8, wherein the first and second composite fiber mat layers are identical.

12. The panel construction according to claim 8, wherein the first and second composite fiber mat layers are not identical.

13. An automotive part comprising the panel construction of claim 1.

14. The automotive part according to claim 13, wherein the automotive part is a lower sound shield, acoustical belly pan, aero shield, splash shield, underbody panel, chassis shield, or a wheel well liner.

* * * * *